United States Patent [19]

Padgaonkar

[11] Patent Number: 4,884,744

[45] Date of Patent: Dec. 5, 1989

[54] AUTOMOTIVE HEATING SYSTEM WITH MULTIPLE INDEPENDENT HEAT SOURCES

[75] Inventor: Arvind J. Padgaonkar, Livonia, Mich.

[73] Assignee: Ford Motor Company, Dearborn, Mich.

[21] Appl. No.: 5,067

[22] Filed: Jan. 20, 1987

[51] Int. Cl.$^4$ .............................................. B60H 1/02
[52] U.S. Cl. .................... 237/12.3 R; 237/12.3 A; 237/12.3 B
[58] Field of Search ................ 237/12.3 B, 12.3 C, 237/12.3 A, 2 A, 12.3 R

[56] References Cited

U.S. PATENT DOCUMENTS

| | | |
|---|---|---|
| 2,038,193 | 4/1936 | Parsons . |
| 2,076,287 | 4/1937 | Arnold . |
| 2,131,635 | 9/1938 | Mullen . |
| 2,621,857 | 12/1952 | Wixon ........................... 237/12.3 C |
| 2,749,050 | 5/1956 | Booth . |
| 3,223,150 | 12/1965 | Tramontini . |
| 3,761,019 | 9/1973 | Delic . |
| 4,087,047 | 5/1978 | Wulf et al. . |
| 4,136,824 | 1/1979 | Kallenbach ..................... 237/12.3 R |
| 4,146,176 | 3/1979 | Beauvais et al. . |
| 4,274,390 | 6/1981 | Azuma . |
| 4,391,235 | 7/1983 | Majkrzak . |
| 4,537,349 | 8/1985 | Stolz ................................. 237/12.3 C |
| 4,667,876 | 5/1987 | Negishi ............................. 237/2 A X |

FOREIGN PATENT DOCUMENTS 2701686  7/1978  Fed. Rep. of Germany ........ 237/11

Primary Examiner—Henry A. Bennet
Attorney, Agent, or Firm—Jerome R. Drouillard; Roger L. May

[57] ABSTRACT

A heating system for the passenger compartment of a motor vehicle with an air breathing, fuel burning engine includes a plurality of heat exchangers with each heat exchanger receiving heat from at least one of a plurality independent heat sources associated with the engine, and means for circulating air serially through each of the heat exchangers and into the passenger compartment. The independent heat sources include coolant circulating through the engine, exhaust gas flowing from the engine, compressed air flowing from a turbocharger associated with the engine to the air intake of the engine, and lubricating oil circulating through the engine.

1 Claim, 2 Drawing Sheets

AUTOMOTIVE HEATING SYSTEM WITH MULTIPLE INDEPENDENT HEAT SOURCES

BACKGROUND OF THE INVENTION

This invention relates to an automotive heating system which utilizes heat from multiple independent sources.

DISCLOSURE INFORMATION

Various types of systems for heating the passenger compartments of motor vehicles are known in the art. A common type of heater system employs a heat exchanger through which heated coolant from the engine circulates. Air is blown through the air-side fins of the heat exchanger and then into the passenger compartment. Because the amount of heat available from the coolant circulating through the heat exchanger depends upon the temperature of the coolant and hence, upon the operating temperature of the vehicle's engine, the heater will not operate properly until the engine has warmed sufficiently. In recognition of this fact, several inventors have attempted to decrease the amount of time required for engine coolant to attain a satisfactory temperature for heater operation by incorporating an exhaust assisted warm-up device into the heating system. Examples of such devices are shown in U.S. Pat. Nos. 2,038,193; 2,749,050; 3,223,150; 4,087,047; and 4,391,235. Each of these systems suffers from several deficiencies. First, because the engine coolant and the heat transfer fluid used to extract heat from the flowing exhaust gases are one and the same, a leak anywhere in the system will cause the engine coolant to be lost, with potentially catastrophic results. A second deficiency resides in the fact that such systems will require a good measure of time merely to warm the engine itself, as opposed to warming the passenger compartment of the vehicle. Finally, because such systems employ only a single heat exchanger for the purpose of warming the air entering the passenger compartment, their performance capabilities are limited.

Automotive designers seeking a quick warming automobile heater have sought to employ steam heat for this purpose. Examples of steam heating apparatus are shown in U.S. Pat. Nos. 2,076,287; 2,131,635; and 3,761,019. Because these devices, too, rely upon only a single heat exchanger within the passenger compartment, and because they rely principally upon exhaust heat as the source of heat energy, their performance is limited. Furthermore, the necessity of handling steam produces unwanted complications in the control systems of such devices.

U.S. Pat. No. 4,146,176, which is assigned to the assignee of the present invention, represents an alternative approach to the heating of a vehicle passenger compartment in which a heat pipe coupled to a heat exchanger located in an engine exhaust system downstream of a catalytic converter is used to transfer heat from the exhaust gas to the heater case. In the system of the '176 patent, engine coolant is not used to supply heat to the passenger compartment. This too, presents a problem which will be more fully discussed below. Finally, U.S. Pat. No. 4,274,390 discloses a water heating and dispensing system for use in an automobile, which utilizes an exhaust pipe heated coil to extract heat from the engine.

It is an object of the present invention to provide an automotive heating system with multiple independent heat sources.

It is an advantage of the present invention that an automotive heating system in accord with the present invention will easily heat the passenger compartments of vehicles driven by certain types of fuel burning engines which engines are not compatible with known types of heating systems.

It is an advantage of the present invention that loss of the heat transfer fluid from part of a heating system according to present invention will not cause loss of working fluid from another part of the system.

It is another advantage of the present invention that a system according to this invention will extract otherwise unusable heat energy from the engine of a vehicle without causing an increase in the exhaust system backpressure.

A heating system according to the present invention is particularly useful with certain types of high efficiency automotive engines. More specifically, this invention is useful with certain engines such as adiabatic diesel engines, or other types of pre-chamber or direct injection diesel engines or certain types of spark ignited or hybrid engines which reject insufficient heat to the engine coolant, (if indeed, any coolant is used), to provide adequate heating capability for the passenger compartment of a vehicle propelled by such an engine.

It has been found that more than one independent heat source must be employed for the purpose of extracting sufficient heat from certain types of automotive engines. Moreover, it is usually not possible to extract sufficient heat from engine exhaust alone in order to raise the temperature of the passenger compartment to a comfortable level because the amount of heat readily available from the exhaust system comprises only about thirty percent (30%) of that required. A heating system according to present invention will overcome these difficulties because it employs multiple independent heat sources, thereby allowing the passenger compartment of a motor vehicle having a low heat rejection engine to be heated to a comfortable level.

SUMMARY OF THE DISCLOSURE

According to this invention, a heating system for the passenger compartment of a motor vehicle with an air breathing, fuel burning engine comprises a plurality of heat exchangers with each of the heat exchangers receiving heat from at least one of a plurality of independent heat sources associated with the engine. A heating system according to the present invention further comprises means for circulating air serially through each of said heat exchangers and into the passenger compartment of the vehicle. The plurality of heat sources from which the plurality of heat exchangers receives heat preferably includes coolant circulating through the engine, exhaust gas flowing from the engine, compressed air flowing from a turbocharger associated with the engine to the air intake of the engine, lubricating oil circulating through the engine, and electrical power generated by the engine. The plurality of heat sources utilized in a heating system according to the present invention may include two, or three, or four or more heat sources.

According to an embodiment of this invention, a heating system for the passenger compartment of a motor vehicle with an air breathing fuel burning engine preferably comprises a first heat exchanger for receiving heat from coolant circulating through the engine, a second heat exchanger supplied with heat by a third heat exchanger and heat transfer system operatively associated with and receiving heat from a heat source associated with said engine other than said coolant, a case for containing the first and second heat exchangers, and a fan for circulating air serially through the first and second heat exchangers and into the passenger compartment.

The third heat exchanger and heat transfer system operatively associated with the second heat exchanger preferably comprises a heat exchanger for receiving and transferring heat from one of said heat sources other than the engine coolant, and a heat transfer fluid circulated from the third heat exchanger to the second heat exchanger. The third heat exchanger and the heat transfer system preferably further comprises a pump and associated conduits for circulating the heat transfer fluid to the second heat exchanger.

DESCRIPTION OF THE PREFERRED EMBODIMENTS

Figure 1:
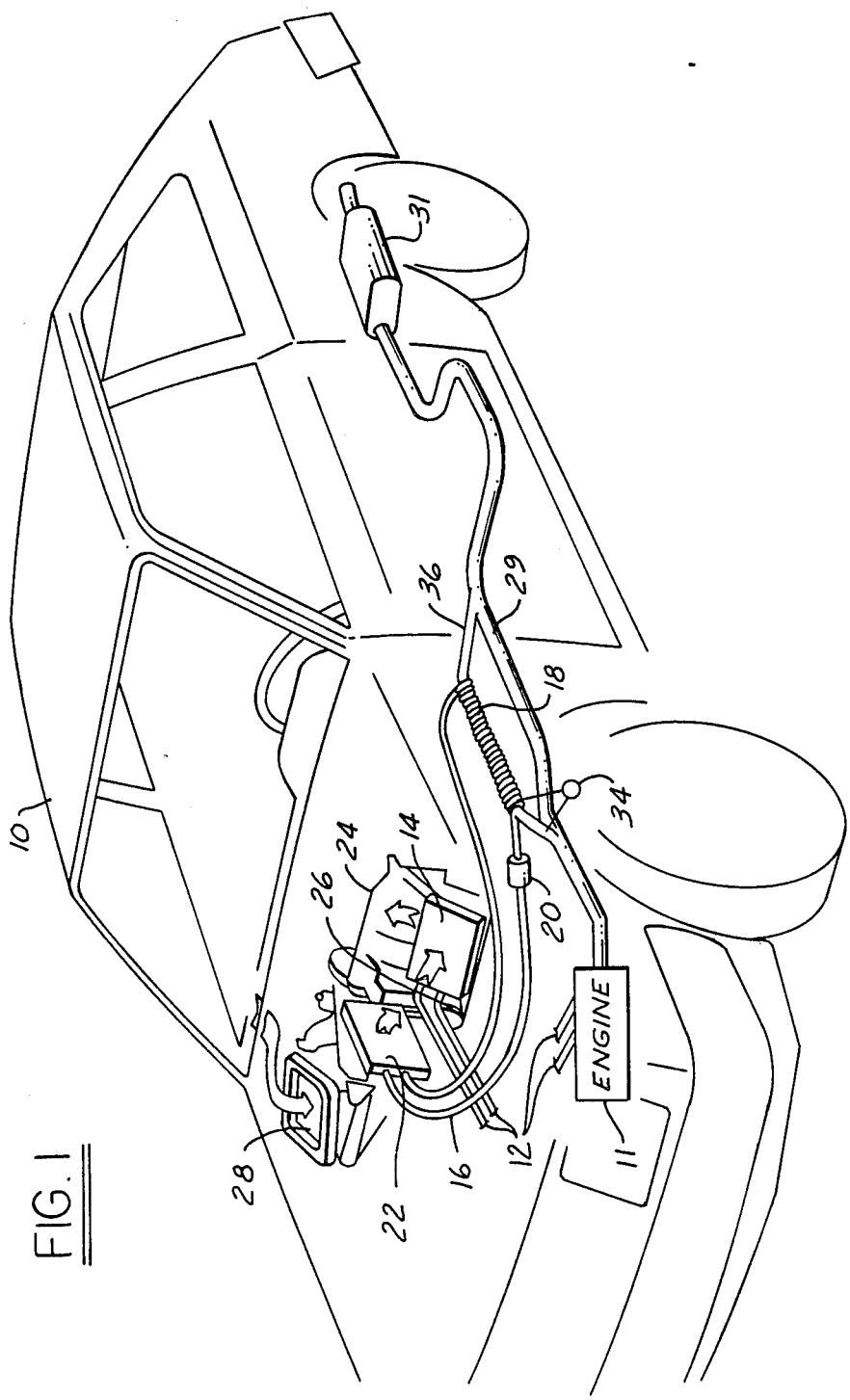
FIG. 1 is a partially schematic view of a motor vehicle having a heating system according to the present invention.

As shown in FIG. 1, an automotive heating system according to the present invention is intended for use with an automotive vehicle having an air breathing fuel burning engine, 11. The engine is connected to exhaust system 29 which includes one or more pipe sections and muffler 31.

The heating system shown in FIG. 1 comprises heater ar intake 28 through which air enters the heating system and a plurality of heat exchangers, in this case first heat exchanger 14 and second heat exchanger 22.

First heat exchanger 14 receives heat from coolant circulating through the engine. Second heat exchanger 22 receives heat from a plurality of sources associated with the engine other than the cooling system. These sources preferably comprise exhaust gas flowing from the engine, or compressed air flowing from a turbocharger associated with the engine to the air intake of the engine, or heated lubricating oil circulating through the engine.

In the embodiment shown in FIG. 1, heat is received by second heat exchanger 22 via third heat exchanger 18 and a heat transfer system operatively associated with the second and third heat exchangers. FIG. 1 shows an example in which third heat exchanger 18 is associated with the exhaust system of engine 11. Although third heat exchanger 18 is illustrated as comprising a coil wound about the outer periphery of bypass line 36 through which a heated fluid such as exhaust gas flows, those skilled in the art will appreciate in view of this disclosure that third heat exchanger 18 may comprise a heat exchanger according to any of several well known designs such as for example, plate fin, and shell and tube designs, in addition to the form illustrated herein. An advantage of the illustrated wound coil type of heat exchanger resides in the fact that this type of heat exchanger architecture offers very little restriction to the flow of exhaust gases, or for that matter, to any other fluid flowing through the bypass of the heat exchanger.

Heat is transferred from third heat exchanger 18 to second heat exchanger 22 by means of a heat transfer fluid which is circulated between the third and second heat exchangers by means of pump 20 and heat transfer fluid conduit 16.

It has been found that the use of a plurality of heat exchangers serially disposed within a heater case, as shown in FIG. 1, produces a beneficial multi-step heating process which operates as follows. Fan 26, which circulates air through the first and second heat exchangers and then to the passenger compartment, will move the circulating air first through one heat exchanger, which will partially warm the air. The air will then circulate through the other heat exchanger and this will cause the partially warmed air to be warmed additionally, with the result that the air discharged into the passenger compartment will be warmer than would be the case were the air to have been warmed by only a single heat exchanger connected to the engine's cooling system. In order to obtain high efficiency from this system, the air should be circulated first through that heat exchanger which has the lowest heat flux.

With certain types of automotive engines, notably certain diesel engines, heat rejection to the coolant of the engine may not be sufficient to provide adequate sensible heat for heating the passenger compartment by means of a heat exchanger receiving heat from the engine coolant, and this may be true even when two heat exchangers are employed in the aforementioned manner. With yet other types of engines such as the gas turbine and adiabatic diesel, this problem will be further exacerbated by the absence of a liquid cooling system. Accordingly, the plurality of heat exchangers used within the heater case of FIG. 1 could be operatively attached to two or more of the alternative heat sources disclosed herein such as the exhaust gas, lubricating oil, compressed air flowing from a turbocharger, and electrical power generated by the engine by means of an alternator or other device driven by the engine. In the latter case, the heat exchanger could, for example, comprise an electrical resistance heater such as a positive temperature coefficient heater, which could be positioned within the heater case in the same manner as either of heat exchangers 14 and 22.

Figure 2:
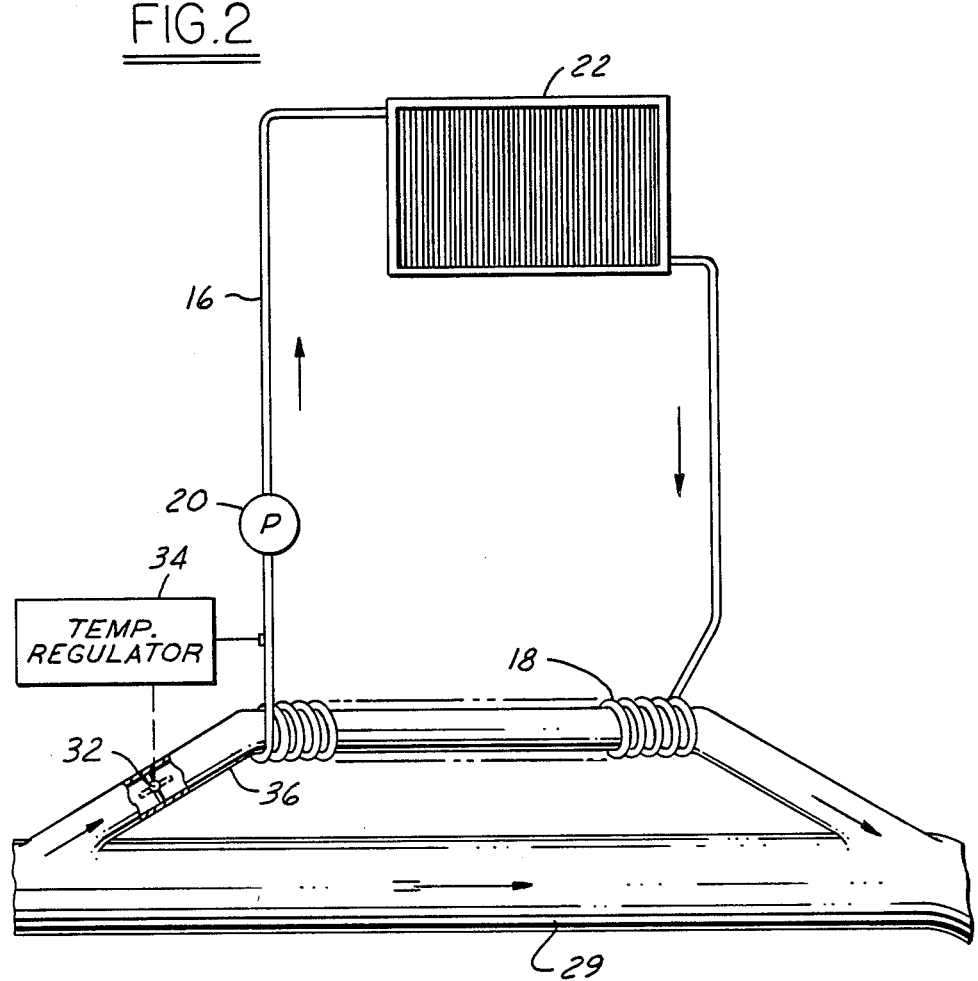
FIG. 2 is a partially schematic view of two heat exchangers and a heat transfer system comprising part of the present invention.

The heat exchanger and heat transfer system shown in FIG. 2 is useful for extracting heat from sources other than the engine's coolant. Accordingly, in similar fashion to that shown in FIG. 1, conduit 29, having a heated fluid flowing therethrough, which fluid may comprise compressed air, lubricating oil, or exhaust gases, or any other type of heated fluid associated with the engine other than the coolant, is bypassed by means of bypass line 36 so as to be brought in contact with third heat exchanger 18. By means of third heat exchanger, heat is extracted from the fluid flowing through bypass line 36 and circulated by means of pump 20 and heat transfer fluid conduit 16. The heated working fluid is ultimately circulated through second heat exchanger 22. Heat is stripped from second heat exchanger 22 by air flowing from fan 26 past the heat exchanger.

The temperature of the heat transfer fluid flowing through the circuit shown in FIG. 2 is controlled by temperature regulator means comprising temperature regulator 34, which senses the temperature of the heat transfer fluid, and valve 32, which is operated by temperature regulator 34 so as to control the volume of heated fluid flowing through bypass line 36. It is desirable to limit the maximum temperature of the heat transfer fluid so that the fluid does not boil. Valve 32 is preferably infinitely adjustable so that fine regulation of the temperature of the fluid flowing through the second heat exchanger is possible. Valve 32 and temperature regulator 34 preferably comprise a thermally activated ported vacuum switch of the type employed in motor vehicles for the purpose of controlling vacuum-operated devices, with the vacuum switch operatively connected to a vacuum source such as the engine's intake manifold, where appropriate, and to a diaphragm driven vacuum motor. The vacuum switch will receive a temperature input from the heat transfer fluid flowing through conduit 16. Those skilled in the art will appreciate in view of this disclosure, however, that the illustrated temperature regulator is merely exemplary of a class of commonly known temperature regulation devices and systems which may be utilized according to the present invention.

Those skilled in the art will further appreciate in view of this disclosure that a variety of heat transfer fluids such as ethylene glycol solutions, or other aqueous solutions or yet other types of heat transfer fluids will be useful for practicing present invention. Similarly, although a vane type pump is preferred, the type of pump chosen to practice the present invention in any particular instance will depend upon the individualized needs of the system being designed. Moreover, the present invention may be practiced without using an auxiliary pump of any kind, such as through the direct circulation of lubricating oil or air discharged by the compressor of a turbocharger directly through second heat exchanger 22. These and all other modifications which basically rely on the teachings through which this disclosure has advanced the art are properly considered within the scope of this invention as defined by the appended claims.

I claim:

1. A heating system for the passenger compartment of a motor vehicle with an air breathing, fuel burning engine, comprising:
    a first heat exchanger for receiving heat from coolant circulating through said engine;
    a second heat exchanger supplied with heat by a third heat exchanger and heat transfer system operatively associated with and receiving heat from a heat source of said engine other than said coolant, with said heat exchanger and heat transfer system comprising a third heat exchanger for receiving and transferring heat, from compressed air flowing from a turbocharger associated with said engine to the air intake of said engine, to a heat transfer fluid circulated from said third heat exchanger to said second heat exchanger;
    a case for containing said first and second heat exchangers; and
    a fan for circulating air serially through said first and second heat exchangers and into said passenger compartment.

* * * * *